April 24, 1956 H. H. P. LEMMERMAN 2,742,786

ELECTRICAL TEMPERATURE RESPONSIVE SYSTEM

Filed Dec. 5, 1952

Inventor:
Harold H.P. Lemmerman,
by Richard E. Hosley
His Attorney.

United States Patent Office 2,742,786

Patented Apr. 24, 1956

2,742,786

ELECTRICAL TEMPERATURE RESPONSIVE SYSTEM

Harold H. P. Lemmerman, Schenectady, N. Y., assignor to General Electric Company, a corporation of New York Application December 5, 1952, Serial No. 324,175

3 Claims. (Cl. 73—361)

This invention relates to temperature measurement and control systems and is particularly applicable to those employing thermocouples as temperature measurement devices in which the thermocouple voltage is compared with a reference voltage corresponding to a temperature which is to be maintained or from which deviations are to be measured.

In temperature measurement and control circuits employing thermocouples in other than laboratory applications wherein constant attendance of an ice bath for the cold thermocouple junction is not objectionable and a delicate standard voltage cell may be employed, two of the major problems involved are the maintenance of the cold thermocouple junction at a known temperature and the provision of a standard voltage which is absolutely constant, by means of apparatus which is rugged and capable of operation over wide ambient temperature ranges. In some applications such as in fuel control systems for portable thermal apparatus, the ambient temperatures for the control apparatus may vary over a wide range such as from −60° F. to +260° F.

Accordingly, it is an object of the present invention to provide an improved temperature measurement and control system employing portable mechanically rugged components for a temperature reference voltage source and for recognition of the thermocouple cold junction temperature.

One system which has been devised for providing a constant reference temperature voltage employs a closely regulated constant direct current generator which supplies a current to a resistor across which the reference voltage appears. This reference voltage may be varied proportional to the ambient temperature, which may also be the temperature of the cold thermocouple junction, to compensate for the changes in thermocouple voltage output, as ambient temperature varies, so as to eliminate the necessity for constant temperature environment for the thermocouple cold junction. This ambient temperature compensating voltage variation may be accomplished by providing two parallel branch circuits for dividing the current of the constant current generator and by inserting a positive coefficient resistor in series in the branch containing the temperature reference voltage resistor. The current through the reference voltage resistor then will decrease as ambient temperature rises because a larger portion of the current is shunted to the other branch, thus decreasing the reference voltage to correspond to the reduced combined hot and cold junction thermocouple voltage output due to the reduced difference between their respective temperatures. In such a system, the change in reference voltage resistor current will be an inverse function of the change in the positive coefficient resistance value. Since the change in thermocouple output due to fluctuations in cold junction (ambient) temperature is a substantially linear function, these linear and inverse functions cannot be perfectly and exactly matched in the system just described, and the cold junction ambient temperature compensation therefore cannot be absolutely accurate.

Accordingly, it is a further object of the present invention to improve the above-described temperature measurement and control system to obtain substantially theoretically perfect cold junction ambient temperature compensation.

Another object of this invention is the provision of a system for producing a voltage proportional to the difference between a predetermined temperature and a variable temperature.

In accomplishing the above objects of the present invention, apparatus may be employed in which a constant current generator supplies two branch circuits of an ambient temperature compensation network in which the first branch circuit includes a positive temperature coefficient resistor and a zero temperature coefficient resistor across which a temperature reference voltage is taken or measured. The second branch circuit includes a parallel combination of positive and negative coefficient resistors which together provide a non-linear resistance curve to permit a current flow in the second branch circuit to compensate for the imperfect matching of the direct and inverse characteristics of the thermocouple voltages and the positive temperature cofficient resistor current of the first network branch. Signals from the measuring circuit may be used to control the temperature of thermal apparatus, such as by energization of a positioning motor for adjusting a fuel valve controlling a flow of fuel to the apparatus.

Further objects and advantages of this invention will become apparent and a better understanding of the invention may be obtained from the following specification and the accompanying drawings in which.

Figure 1:
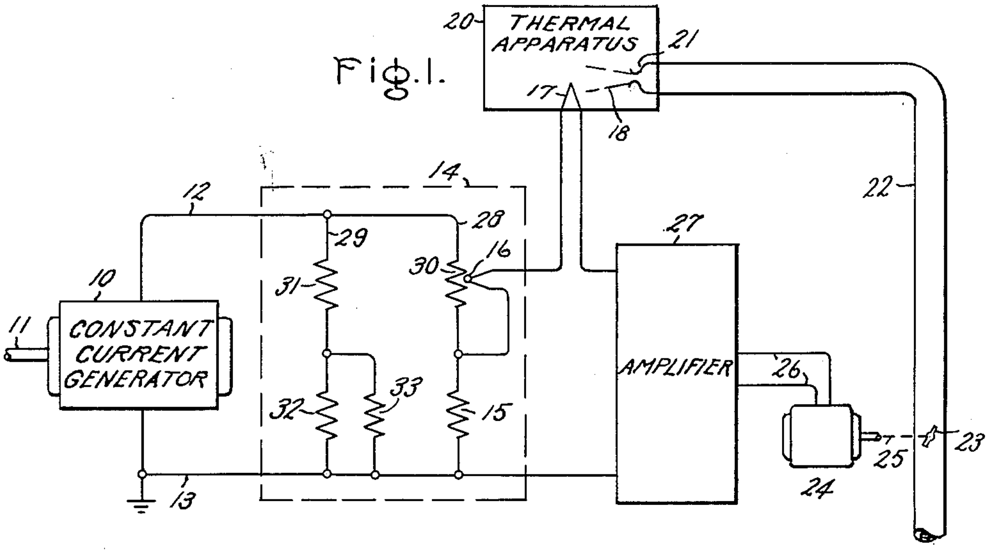
Fig. 1 is a schematic diagram of a preferred embodiment of a system employing the present invention.

Referring more particularly to Fig. 1, there is shown a constant current generator 10 which may be driven through a suitable shaft 11 by a prime mover (not shown). The constant current generator is connected at 12 and 13 to supply a current of constant magnitude to a resistor network 14 which includes a zero temperature coefficient resistor 15. By the expression "zero temperature coefficient," it is meant that the resistance of resistor 15 undergoes substantially no change over a wide variation in temperature. Similarly, in the discussion which follows, a "positive temperature coefficient resistor" is defined as one in which the resistance value increases upon an increase in temperature and conversely, a "negative temperature cofficient resistor" is one in which the resistance decreases upon an increase in temperature.

Since a portion of the current from generator 10 passes through resistor 15, a voltage is thereby caused to appear across resistor 15. This resistor is connected in series with a cold junction thermocouple 16 and a hot junction thermocouple 17 to provide a temperature measurement circuit in which the voltage across resistor 15 is a reference voltage corresponding to the combined thermocouple voltage at a desired temperature at the hot junction 17. Any deviation from the desired temperature at hot junction 17 causes an "error voltage," having a polarity and magnitude dependent upon the direction and magnitude of the temperature deviation, which is supplied from this temperature measurement circuit to an amplifier 27.

The hot junction thermocouple 17 is located in a thermal apparatus 20 which may be a fuel burning engine or furnace in which combustion of liquid fuel takes place. The fuel may be supplied from a nozzle 21 and sprayed into the thermal apparatus as indicated at 18 for combustion therein. Fuel is supplied to the nozzle 21 through a fuel line 22 from a suitable source (not shown). A valve device schematically shown at 23 may be interposed in the fuel line 22 to control the amount of fuel supplied to the combustion nozzle 21. The valve 23 may be positioned by an electrical positioning motor 24 through a shaft schematically shown at 25. The motor 24 may be energized from amplifier 27 through amplifier output connections 26. When the desired temperature is exceeded, the voltage generated by hot junction thermocouple 17 and cold junction thermocouple 16 exceed the voltage provided across resistor 15 and a voltage of one direct current polarity is supplied to the amplifier 27 causing energization of the positioning motor 25 for rotation of the valve 23 to decrease the fuel flow through fuel line 22 to nozzle 21. If the temperature of the thermal apparatus 20 decreases below the control point value, the polarity of the direct current voltage error signal supplied to amplifier 27 by the temperature measurement circuit will reverse, and the positioning motor 24 will be energized for rotation in the opposite direction, opening fuel valve 23 to permit more fuel flow through fuel line 22 to the nozzle 21.

Obviously, the accuracy of the temperature control provided by this system depends upon the accuracy with which the voltage across resistor 15 is maintained and therefore upon the accuracy with which the current from constant current generator 10 is maintained. Any suitable high gain current regulator may be employed for this purpose and may be incorporated as a part of the constant current generator 10. By way of illustration, one suitable current regulating apparatus for this purpose has been found to be a magnetic type such as is disclosed in Patent 2,053,154, issued to Cramer W. La Pierre on September 1, 1936, for a "Direct Current Indicator," which is assigned to the same assignee as the present application.

As is well-known, a pair of thermocouples measures a temperature difference between the hot junction and the cold junction. In the present system, since it is impractical to hold the cold junction 16 at a constant temperature value, the reference voltage supplied across resistor 15 is modified in order to compensate for the change in voltage output of the thermocouples caused by the fluctuation in the ambient temperature encountered by cold junction 16. This compensation is provided by the network 14 which includes a first branch circuit 28 and a second branch circuit 29 connected in parallel. The first branch circuit 28 includes a positive temperature coefficient resistor 30 in addition to the zero temperature coefficient resistor 15. The second branch circuit 29 includes a zero temperature coefficient resistor 31, a negative temperature coefficient resistor 32 in series with resistor 31, and a positive temperature coefficient resistor 33 in parallel with resistor 32. Cold junction thermocouple 16 is preferably positioned adjacent to positive temperature coefficient resistor 30 in order that their respective temperatures may be identical. When the ambient temperature, and the temperature of the cold junction thermocouple 16, resistor 30, and the remainder of network 14 increases, the resistance of positive temperature coefficient resistor 30 increases, causing a corresponding decrease in the proportion of current carried by branch circuit 28 and an increase in the current carried by branch circuit 29. The decrease in the current in branch circuit 28 causes a corresponding decrease in the voltage across reference voltage resistor 15. This decrease in voltage compensates for the decrease in thermocouple voltage due to the rise in ambient temperature. Obviously, the network will compensate in a similar manner for decreases in ambient temperature.

Figure 2:
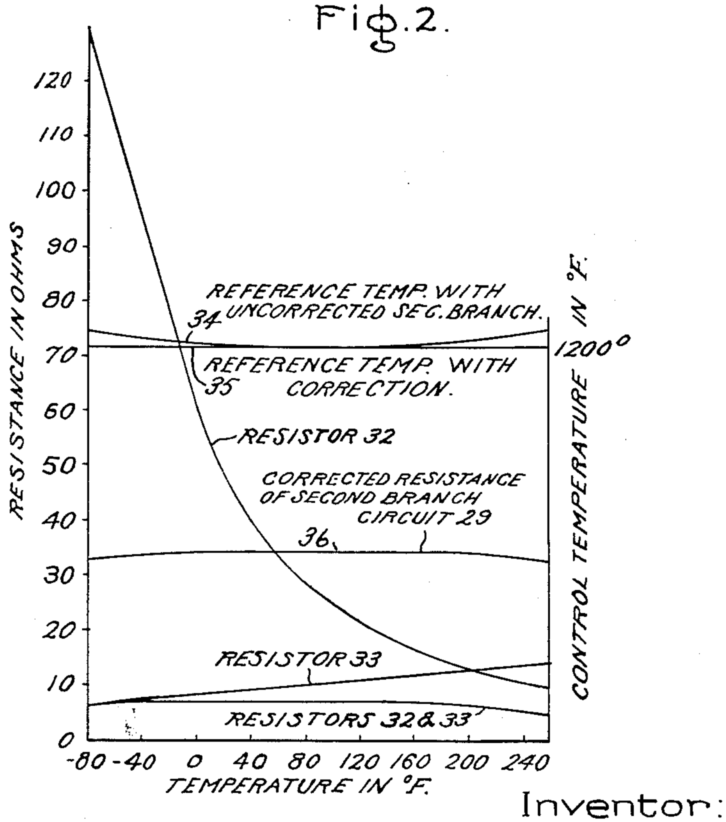
Fig. 2 is a diagram showing curves of temperature versus resistance of various resistors and resistor combinations in the resistor network of the embodiment of the invention shown in Fig. 1 and variations in the reference temperature set by the reference voltage with and without the improved compensation provided by the present invention.

It has been found in practice that even with a second branch circuit 29 consisting entirely of zero temperature coefficient resistance, a remarkable degree of ambient temperature compensation over a wide range of temperatures beyond the range normally considered as ambient temperatures may be obtained. For instance, in Fig. 2, curve 34 shows the performance of such a network in terms of the reference temperature which can be held over in a wide range of "ambient" temperatures from −60° to +260° F. It will be assumed in the following discussion that the desired temperature of the thermal apparatus to be controlled or the temperature from which deviations are to be measured is 1200° F., as indicated in Fig. 2 on the righthand vertical scale. It will be seen that the curve 34 provides a deviation from the desired constant 1200° line indicated at 35. This deviation is caused due to the fact that although the positive temperature coefficient resistor 30 varies directly with temperature, the current which it controls through branch circuit 28, and the resulting voltage supplied across reference voltage resistor 15 varies inversely to this resistance change. It may be said therefore that there is an inverse or non-linear characteristic in the diversion of current from branch circuit 28 by the increase in the resistance of resistor 30 as the ambient temperature increases.

This deficiency is overcome in the present invention as follows. The parallel combination of negative temperature coefficient resistor 32 and positive temperature coefficient resistor 33 is designed to obtain a resistance temperature characteristic for the branch circuit 29 as shown by curve 36 of Fig. 2. The resistance values are indicated by the left hand vertical scale. This characteristic permits lowered resistances and an increase in the second branch current at the extreme ends of the "ambient" temperature range. Exact compensation for the curvature of the reference temperature characteristic represented by curve 34 is thereby obtained and the desired constant reference temperature represented by curve 35 is the result.

The remaining curves of Fig. 2 labeled "resistor 32," "resistor 33" and "resistors 32 and 33" indicate how the parallel combination of the negative and positive resistance coefficient resistors was chosen to obtain the precise concave downward resistance temperature characteristic curve shape desired. The zero temperature coefficient resistor 31 was then chosen with a proper value to raise the total resistance of second network branch 29 to the required level as shown by curve 36.

The current supplied from constant current generator 10 preferably has a very small value, for instance in the order of 6 milliamperes. Therefore the heating of the resistors due to current flow is negligible. With one physical embodiment of the present invention employing thermocouples of a chromium-nickel alloy and an aluminum-nickel alloy, a satisfactory network was obtained with the resistor values shown in the curves of Fig. 2 for second branch circuit 29 and with resistor 15 at a value of approximately 9 ohms and resistor 30 at a value of approximately 23 ohms at ordinary room temperature.

Although the generator 10 has been characterized above as a "constant current" generator, an actual physical embodiment produced according to the teachings of La Pierre Patent 2,053,154 may produce a current which decreases slightly as the ambient temperature increases over the wide range mentioned above. It will be obvious, however, that the network 14 may be designed to compensate for this slight variation as well as the much larger opposite variation due to changes in the thermocouple output.

While a specific embodiment of the invention has been shown and described, it will be understood that various modifications may be made without departing from the invention. The appended claims therefore are intended to cover all such modifications as fall within the true spirit and scope of the invention.

What I claim as new and desire to secure by Letters Patent of the United States is:

1. An ambient temperature compensation network for a thermocouple temperature measuring system for measuring a deviation from a desired temperature determined by a reference voltage comprising first and second parallel connected branch circuits for reception of a constant amplitude direct current, said first branch circuit comprising a first zero temperature resistance coefficient resistor across which the temperature reference voltage may be taken and a series connected ambient temperature compensating positive temperature resistance coefficient resistor, said second branch comprising a second zero temperature resistance coefficient resistor and a parallel combination of positive and negative temperature resistance coefficient resistors connected in series therewith, said last named resistors being chosen to provide a higher combined resistance in the intermediate portion than at the extremities of the intended ambient temperature range of operation to compensate for the inverse characteristic in the diversion of current from said first branch by said compensating resistor.

2. A temperature responsive electrical system for producing a voltage directly proportional to the difference between the system temperature and a predetermined fixed temperature comprising a first branch circuit including a zero temperature coefficient output resistor and a positive temperature coefficient compensating resistor connected in series therewith, a second branch circuit connected in parallel with said first branch circuit and comprising a parallel combination of positive and negative temperature coefficient resistors, and a constant current generator connected to supply a constant current to said parallel connected branch circuits, said last named resistors being chosen to provide a higher combined resistance in the intermediate portion than at the extremities of the intended ambient temperature range of operation to compensate for the inverse characteristic in the diversion of current from said first branch by said compensating resistor.

3. An electrical temperature measurement system comprising a source of direct current of constant amplitude, an electrical resistance network connected to said constant current source comprising a first parallel branch circuit including a positive temperature resistance coefficient resistor and a zero temperature resistance coefficient resistor connected in series, and a second parallel branch circuit comprising positive and negative temperature resistance coefficient resistors connected in parallel, a temperature measurement circuit comprising hot and cold junction thermocouples and said zero temperature resistance coefficient resistor connected in series, said hot junction being positioned for detection of a temperature to be measured and said cold junction being positioned in proximity to said positive temperature resistance coefficient resistor of said first branch circuit, said second branch circuit resistors being chosen to provide a total branch circuit resistance having a lower value at the extremities of the ambient temperature range of operation than in the intermediate portion thereof to compensate for the non-linear current characteristic of said first branch circuit.

References Cited in the file of this patent

UNITED STATES PATENTS

| | | |
|---|---|---|
| 1,643,668 | Lindblad | Sept. 27, 1927 |
| 2,015,968 | Ryder | Oct. 1, 1935 |
| 2,050,703 | Johnson | Aug. 11, 1936 |
| 2,250,712 | Johnson | July 29, 1941 |